US011494797B1

(12) United States Patent
Walker et al.

(10) Patent No.: US 11,494,797 B1
(45) Date of Patent: Nov. 8, 2022

(54) ELECTRONIC SYSTEM INCLUDING ELECTRONIC MESSAGE BASED ELECTRONIC SHOPPING LIST GENERATION AND RELATED METHODS

(71) Applicant: INMAR CLEARING, INC., Winston-Salem, NC (US)

(72) Inventors: Jess D. Walker, Georgetown, TX (US); Bryan Bartow, Leander, TX (US); David E. Johnson, Cedar Park, TX (US); Chris Rebstock, Round Rock, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 223 days.

(21) Appl. No.: 15/915,429

(22) Filed: Mar. 8, 2018

(51) Int. Cl.
*G06Q 30/02* (2012.01)
*G06Q 30/06* (2012.01)
*G06Q 50/00* (2012.01)
*H04L 67/10* (2022.01)

(52) U.S. Cl.
CPC ..... *G06Q 30/0224* (2013.01); *G06Q 30/0238* (2013.01); *G06Q 30/0633* (2013.01); *H04L 67/10* (2013.01); *G06Q 50/01* (2013.01)

(58) Field of Classification Search
CPC ................ G06Q 30/0207–30; G06Q 30/0277
USPC .................................................... 705/14, 319
See application file for complete search history.

(56) References Cited

U.S. PATENT DOCUMENTS

| | | | |
|---|---|---|---|
| 7,886,000 B1 | 2/2011 | Polis et al. | |
| 8,375,320 B2 | 2/2013 | Kotler et al. | |
| 2003/0105681 A1 | 6/2003 | Oddo | |
| 2009/0083032 A1 | 3/2009 | Jablokov et al. | |
| 2010/0268597 A1 | 10/2010 | Bookstaff | |
| 2011/0087497 A1* | 4/2011 | Avallone | G06Q 30/02 705/1.1 |
| 2012/0101881 A1 | 4/2012 | Taylor et al. | |
| 2012/0158589 A1 | 6/2012 | Katzin et al. | |
| 2015/0073899 A1* | 3/2015 | Carpenter | B62B 3/142 705/26.8 |
| 2016/0071149 A1 | 3/2016 | Farshori | |
| 2017/0262873 A1* | 9/2017 | Atchley | G06Q 50/01 |
| 2018/0181983 A1* | 6/2018 | Horowitz | G06K 7/1417 |
| 2018/0293604 A1* | 10/2018 | Li | G06Q 30/0224 |

* cited by examiner

*Primary Examiner* — Waseem Ashraf
*Assistant Examiner* — Richard G Reinhardt
(74) *Attorney, Agent, or Firm* — Allen, Dyer, Doppelt + Gilchrist, P.A.

(57) ABSTRACT

An electronic system may a remote computer that may parse an electronic message received by a mobile wireless communications device of a given user for a keyword indicative of a desired item for purchase. The remote computer may obtain a user identifier associated with the given user for a retailer loyalty program for a given retailer. The remote computer may also access the retailer loyalty program based upon the user identifier and generate an electronic shopping list for the given retailer based upon the access to the retailer loyalty program and send the electronic shopping list to the mobile wireless communications device. The shopping list may include the desired item for purchase. The remote computer may also generate a digital promotion associated with at least one item on the electronic shopping list and send notification of the digital promotion to the mobile wireless communications device.

18 Claims, 5 Drawing Sheets

ELECTRONIC SYSTEM INCLUDING ELECTRONIC MESSAGE BASED ELECTRONIC SHOPPING LIST GENERATION AND RELATED METHODS

TECHNICAL FIELD

The present invention relates to the field of electronics, and more particularly, to the processing of electronic messages and related methods.

BACKGROUND

An electronic message is an increasingly popular form of communication between users. One type of electronic message is an email. An email message is typically prepared by a user and communicated to a desired recipient by way of an email address. Upon sending, an email is typically stored in the recipient's email inbox until read and/or deleted. Another type of electronic message is a text message. A text message may be considered a form of instant message and may include a short message service (SMS) message or internet based instant message. A text message is typically a short informal message, and similar to an email, does not require a recipient to be present for receipt of a message. A text message may also interact with automated systems, for example.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, size of the product in terms of packaging, and/or the price point of the given item.

SUMMARY

An electronic system may include a mobile wireless communications device associated with a given user and configured to send and receive a plurality of electronic messages. The electronic system may also include a remote computer configured to parse an electronic message received by the mobile wireless communications device of the given user for a keyword indicative of a desired item for purchase and obtain a user identifier associated with the given user for a retailer loyalty program for a given retailer. The remote computer may also be configured to access the retailer loyalty program based upon the user identifier and generate an electronic shopping list for the given retailer based upon the access to the retailer loyalty program and send the electronic shopping list to the mobile wireless communications device. The shopping list may include the desired item for purchase. The remote computer may also be configured to generate a digital promotion associated with at least one item on the electronic shopping list and send notification of the digital promotion to the mobile wireless communications device.

The digital promotion may be for the desired item. The digital promotion may be for an item on the electronic shopping list other than the desired item, for example.

The electronic message may include a short message service (SMS) message. The electronic message may include an email message, for example. The electronic message may include social media feed message, for example.

The keyword may include a descriptive term for the desired item. The user identifier may include at least one of an email address associated with the given user, a telephone number associated with the given user, and social media identifier associated with the user, for example. The remote computer may be configured to store a purchase history associated with the given user and generate the digital promotion based upon purchase history.

The electronic system may further include a point-of-sale (POS) terminal configured to communicate products being purchased thereat to the remote computer during a purchase transaction and associated with the given user based upon the user identifier. The remote computer and the POS terminal may cooperate to redeem the digital promotion when the at least one item of the electronic shopping list is being purchased at the POS terminal, for example.

A method aspect is directed to a method of sending notification of a digital promotion to a mobile wireless communications device associated with a given user. The method may include using a remote computer to parse an electronic message received by the mobile wireless communications device of the given user for a keyword indicative of a desired item for purchase and obtain a user identifier associated with the given user for a retailer loyalty program for a given retailer. The remote computer may also be used to access the retailer loyalty program based upon the user identifier and generate an electronic shopping list for the given retailer based upon the access to the retailer loyalty program and send the electronic shopping list to the mobile wireless communications device. The shopping list may include the desired item for purchase. The remote computer may further be used to generate a digital promotion associated with at least one item on the electronic shopping list and send the notification of the digital promotion to the mobile wireless communications device.

A computer readable medium aspect is directed to a non-transitory computer readable medium for a remote computer in an electronic system that includes a mobile wireless communications device associated with a given user. The non-transitory computer readable medium includes computer executable instructions that when executed by a processor of the remote computer cause the processor to perform operations. The operations may include parsing an electronic message received by the mobile wireless communications device of the given user for a keyword indicative of a desired item for purchase and obtaining a user identifier associated with the given user for a retailer loyalty program for a given retailer. The operations may also include accessing the retailer loyalty program based upon the user identifier and generating an electronic shopping list for the given retailer based upon the access to the retailer loyalty program and sending the electronic shopping list to the mobile wireless communications device. The shopping list may include the desired item for purchase. The operations may also include generating a digital promotion associated with at least one item on the electronic shopping list and sending notification of the digital promotion to the mobile wireless communications device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
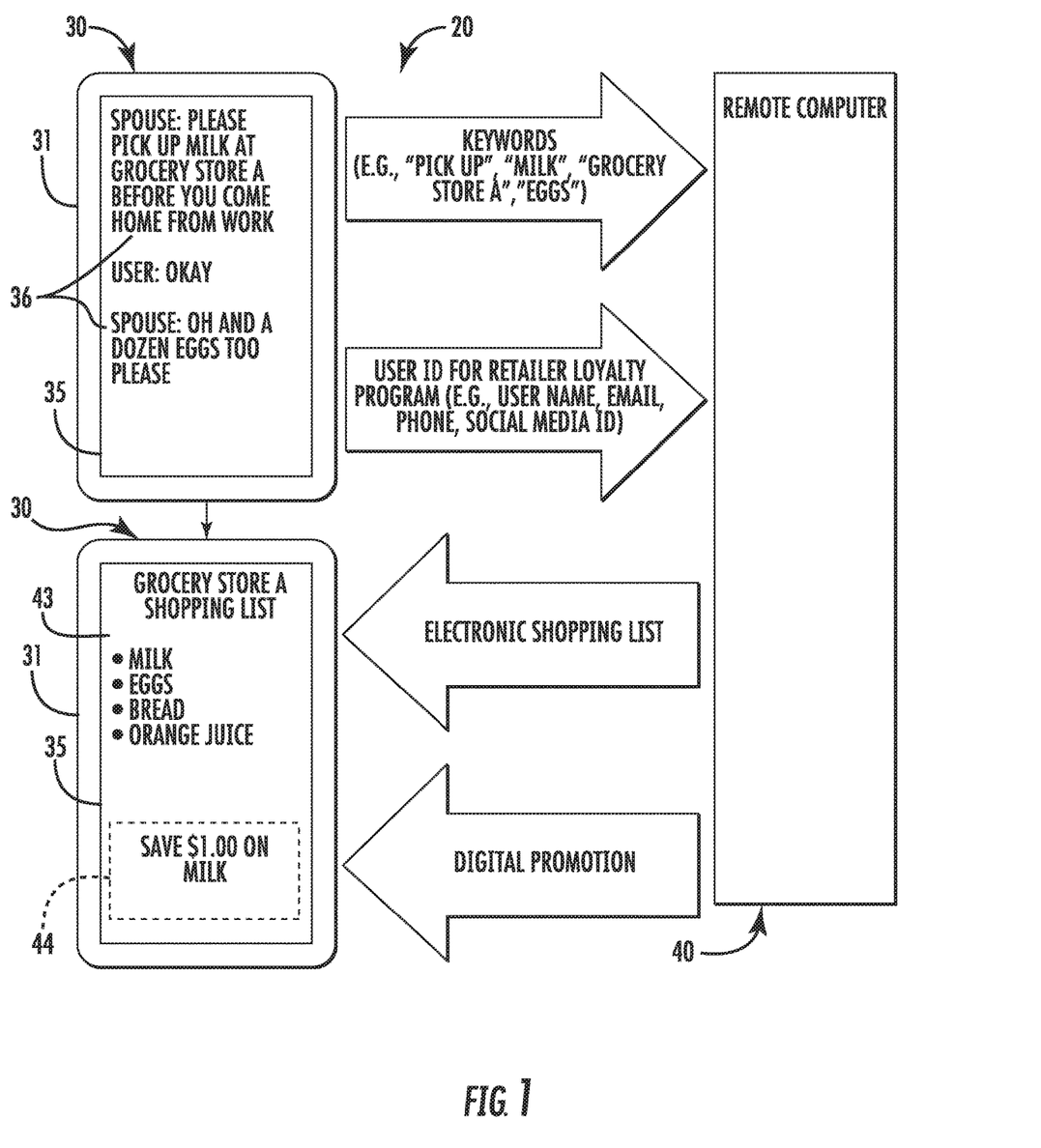
FIG. 1 is a schematic diagram of an electronic system in accordance with an embodiment.
Figure 2:
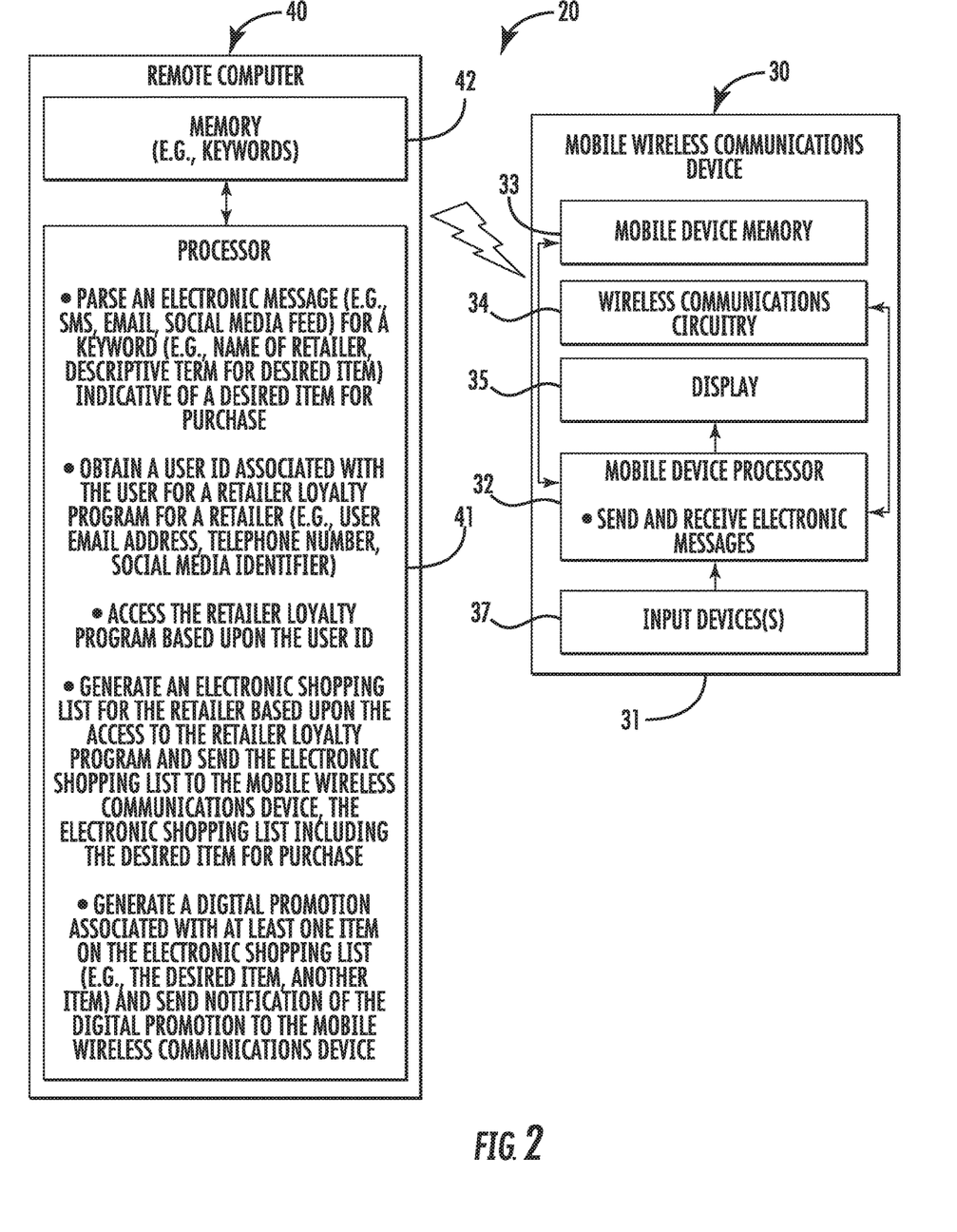
FIG. 2 is a more detailed schematic diagram of the electronic system of FIG. 1.

Referring initially to FIGS. 1 and 2 an electronic system 20 includes a mobile wireless communications device 30 associated with a given user. The mobile wireless communications device 30 illustratively includes a portable housing 31, a mobile device processor 32, a mobile device memory 33 coupled to the mobile device processor, and wireless communications circuitry 34 coupled to the mobile device processor. The mobile wireless communications device 30 also includes a display 35, such as, for example, a touch display, carried by the portable housing 31 and coupled to the mobile device processor 32. The mobile wireless communications device 30 may include one or more input devices 37 and other types of output devices. The mobile wireless communications device 30 may be a mobile phone or smartphone, a tablet computer, or other type of mobile wireless communications device, as will be appreciated by those skilled in the art.

The mobile wireless communications device 30 may be configured to send and receive electronic messages 36. For example, the mobile wireless communications device 30 may be configured to send and receive short-message-service (SMS) messages, email messages, internet-based messages or instant messages (e.g., internet based instant messages, iMessage, chat bots), and/or social media feed messages. Of course, the mobile wireless communications device may be configured to send and receive other and/or additional types of messages.

The system 20 also includes a remote computer 40 coupled to the mobile wireless communications device 30. The remote computer 40 includes a remote processor 41 and a remote memory 42 coupled to the remote processor. The remote computer 40 may be a cloud server, for example.

Figure 3:
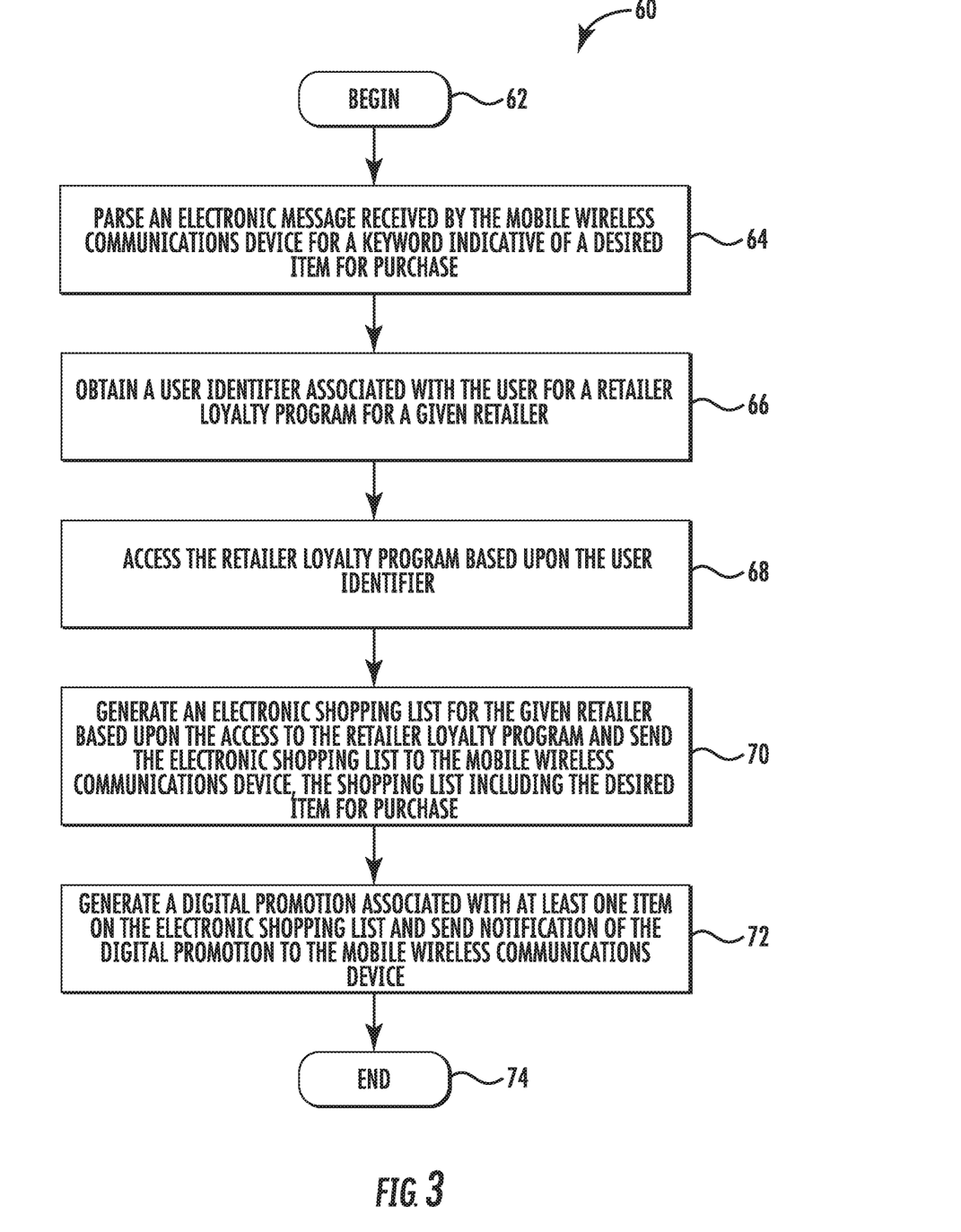
FIG. 3 is a flow diagram illustration operation of the electronic system of FIG. 2.

Referring now additionally to the flowchart 60 in FIG. 3, details of operation of the electronic system 20 will now be described with reference to the remote computer 40. Beginning at Block 62, the remote computer 40 parses an electronic message 36 received by the mobile wireless communications device 30 of the given user for a keyword indicative of a desired item for purchase (Block 64). As will be appreciated by those skilled in the art, an application running on the mobile wireless communications device 30, may be executed by the mobile wireless communications device and provide access to and/or communicate the electronic messages 36 to the remote computer 40. The application may be associated with the remote computer 40 and/or associated with a given retailer. The application may communicate data between or among other applications.

The keyword may be the name of the given retailer and/or a descriptive term for the desired item for purchase. The description term may also include a phrase, for example. The desired item may be specific to brand and/or type of item for purchase.

In an exemplary implementation, the given user may be communicating via SMS message with his or her spouse. For example, the spouse may send an SMS message to the given user to, "Please pick up milk at Grocery Store A before you come home from work." The given user may respond, "Okay," and spouse may respond, "Oh and a dozen eggs too please" (FIG. 1). The remote computer 40 obtains the SMS messages from the mobile wireless communications device of the given user and parses or "looks" for certain keywords and phrases that may be indicative of items for a list at the given retailer (FIG. 1). For example, the remote computer may identify "pick up," "milk," "Grocery Store A," and "dozen eggs" as keywords (FIG. 1). Other and/or additional keywords may identified, and the keywords may be stored in the memory 42 of the remote computer 40.

At Block 66, the remote computer 40 obtains a user identifier associated with the given user for a retailer loyalty program for a given retailer. The user identifier may be any of an email address associated with the given user, a telephone number associated with the given user, and/or a social media identifier (e.g., social media username). The user identifier may be communicated from the mobile wireless communications 30 device to the remote computer 40 from an application, for example, as described above, either associated with the retailer, associated with the remote computer 40, and/or by way of communication between or among applications. For example, the given user may be a member of the retailer loyalty for the given retailer and credentials for access to the loyalty program (e.g., phone number) may be entered into the application on the mobile wireless communications device 30.

The remote computer 40 accesses the retailer loyalty program based upon the user identifier (Block 68) and generates, at Block 70, an electronic shopping list 43 for the given retailer based upon the access to the retailer loyalty program. The electronic shopping list 43 includes the desired item for purchase. The electronic shopping list 43 is sent to the mobile wireless communications device 30.

With respect to the exemplary implementation above, the application may access the retailer loyalty program and generate an electronic shopping list 43 to include milk and eggs (FIG. 1). As will be appreciated by those skilled in the art, most retailer loyalty programs have a list feature associated therewith that allows the given user to add, modify, and/or delete shopping list items for a later shopping trip. The milk and eggs parsed from the electronic message or SMS message of the spouse will be added to the grocery list for Grocery Store A by way of the loyalty program (FIG. 1).

At Block 72, the remote computer 40 generates a digital promotion 44 associated with at least one item on the electronic shopping list 43 and sends and sends notification of the digital promotion to the mobile wireless communications device 30, before ending at Block 74. The digital promotion 44 may be communicated to the mobile wireless communications device 30 and/or stored in a digital wallet associated with the given user, for example, at the remote computer 40, at the mobile wireless communications device, and/or at a computer associated with the given retailer and accessible by way of the retail loyalty program.

The digital promotion 44 may be for the desired item or items. For example, with respect to exemplary implementation, the digital promotion 44 may be a digital coupon or electronic rebate for either or both of milk and eggs (FIG. 1). In some embodiments, the digital promotion 44 may be for an item on the electronic shopping list 43 other than the desired item. For example, if a particular brand of items is added to the electronic shopping list 43, the digital promotion may be for a different brand and/or type. Alternatively or additionally, if the given user already had a running electronic shopping list by way of the retail loyalty program, the digital promotion 44 may be for one or more of the items in the already running electronic shopping list for purchase.

In some embodiments, the remote computer 40 may store a purchase history associated with the given user, for example in the memory 42. The remote computer 40 may thus generate the digital promotion based upon the purchase history. For example, referring again to the exemplary implementation, if the given user historically buys bread with milk and eggs, the digital promotion may be for bread, regardless of whether bread is on the electronic shopping 43 list or not.

Figure 4:
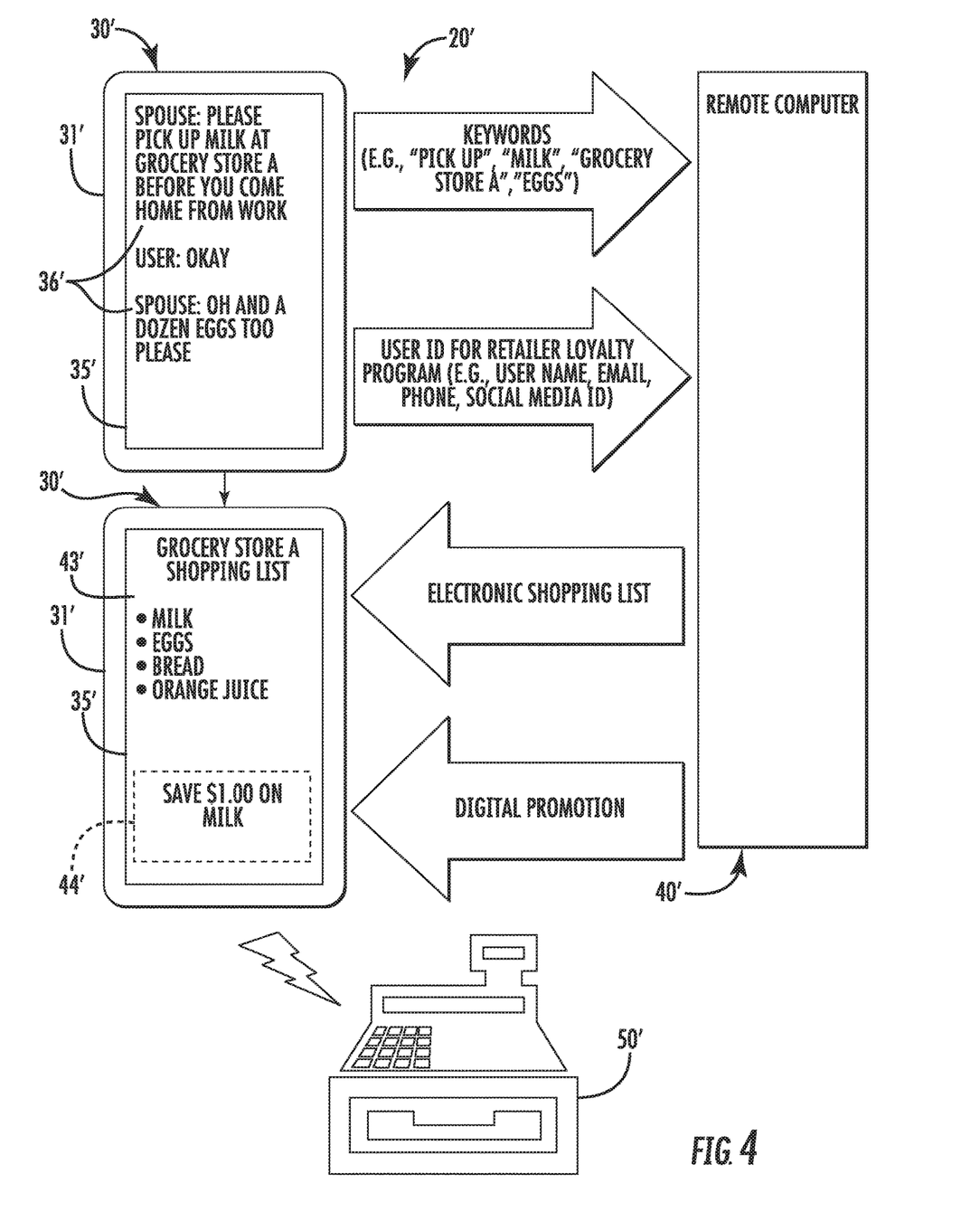
FIG. 4 is a schematic diagram of an electronic system in accordance with an embodiment.
Figure 5:
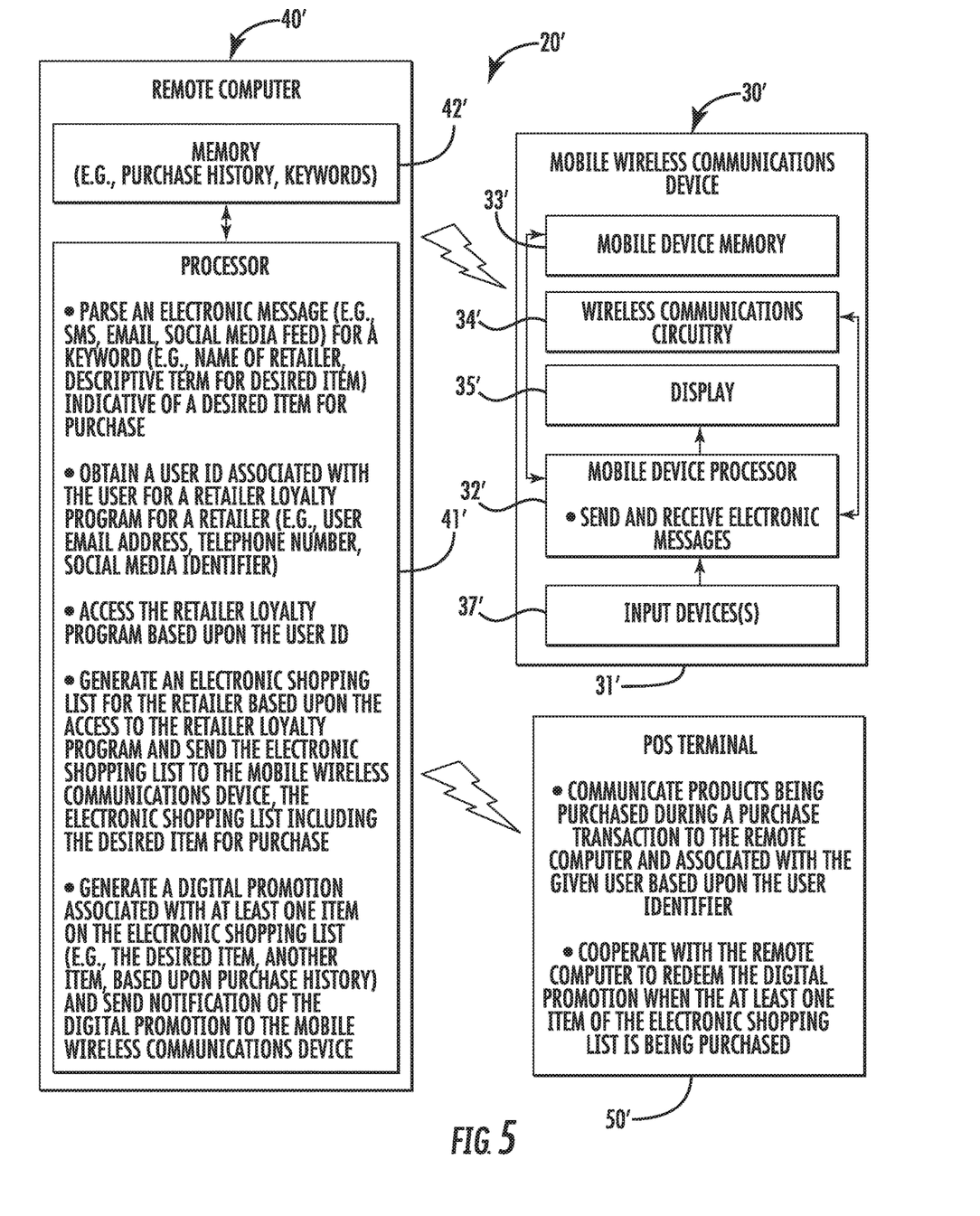
FIG. 5 is a more detailed diagram of the electronic system of FIG. 4.

Referring now to FIGS. 4 and 5, in another embodiment, the electronic system 20' also includes a point-of-sale (POS) terminal 50'. The POS terminal 50' communicates products being purchased thereat during a purchase transaction and that are associated with the given user based upon the user identifier. For example, the user may provide the user identifier to the POS terminal 50' to link the purchase transaction to the given user's retailer loyalty program. The products may be communicated to the remote computer 40', for example. The products may be communicated to other and/or additional computers. The POS terminal 50' and the remote computer 40' cooperate to redeem the digital promotion 44' when the item on the electronic shopping list 43' is being purchased at the POS terminal. In other words, the cooperation between the POS terminal 50' and the remote computer 40' provide verification for redemption of the digital promotion 44', for example, to reduce the amount of fraudulent redemption. Elements illustrated with respect to this embodiment, but not specifically described are similar to those described above.

While the exemplary implementation refers to food and a grocery store, it should be understood that the items for purchase may be any type of item and the retailer may be any type of retailer, for example, home improvement, wholesale club, etc. Moreover, while various functions of the mobile wireless communications device 30, remote computer 40, and POS terminal 50' have been described herein, it should be understood that these functions are performed through cooperation with respective processors and memories.

A method aspect is directed to a method of parsing an electronic message 36 received by a mobile wireless communications device 30 associated with a given user. The method includes using a remote computer 40 to parse the electronic message 36 received by the mobile wireless communications device 30 of the given user for a keyword indicative of a desired item for purchase and obtain a user identifier associated with the given user for a retailer loyalty program for a given retailer. The remote computer 40 is also used to access the retailer loyalty program based upon the user identifier and generate an electronic shopping list 43 for the given retailer based upon the access to the retailer loyalty program and send the electronic shopping list to the mobile wireless communications device 30. The electronic shopping list 43 includes the desired item for purchase. The remote computer 40 is further used to generate a digital promotion 44 associated with at least one item on the electronic shopping list 43 and send notification of the digital promotion to the mobile wireless communications device 30.

A computer readable medium aspect is directed to a non-transitory computer readable medium for a remote computer 40 in an electronic system 20 that includes a mobile wireless communications device 30 associated with a given user. The non-transitory computer readable medium includes computer executable instructions that when executed by a processor 41 of the remote computer 40 cause the processor to perform operations. The operations include parsing an electronic message 36 received by the mobile wireless communications device 30 of the given user for a keyword indicative of a desired item for purchase and obtaining a user identifier associated with the given user for a retailer loyalty program for a given retailer. The operations also include accessing the retailer loyalty program based upon the user identifier and generating an electronic shopping list 43 for the given retailer based upon the access to the retailer loyalty program and sending the electronic shopping list to the mobile wireless communications device 30. The electronic shopping list 43 includes the desired item for purchase. The operations also include generating a digital promotion 44 associated with at least one item on the electronic shopping list 43 and sending notification of the digital promotion to the mobile wireless communications device 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic system comprising:
a mobile wireless communications device associated with a given user and configured to send and receive a plurality of private two-way instant electronic messages between the given user and another user and store a plurality of user identifiers associated with the given user each for a corresponding retailer loyalty program for a given retailer from among a plurality of retailers and at least one access credential for accessing the corresponding retailer loyalty program;
a remote computer configured to
parse received private two-way instant electronic messages received by the mobile wireless communications device of the given user to determine existence of a plurality of keywords in a given received private two-way instant electronic message that are indicative of a desired item for purchase, the plurality of keywords comprising a retail store name associated with the given retailer, a descriptive term for the desired item for purchase, and a command action term for the desired item for purchase, and
upon determining existence of the plurality of keywords in the given received private two-way instant electronic message, obtain the user identifier and the at the least one access credential from the mobile wireless communications device corresponding to the given retailer associated with the parsed retail store name, access the retailer loyalty program based upon the user identifier and the at least one access credential, generate an electronic shopping list for the given retailer based upon the access to the retailer loyalty program and send the electronic shopping list to the mobile wireless communications device, the shopping list comprising the desired item for purchase, and generate a digital promotion associated with at least one item on the electronic shopping list and send notification of the digital promotion to the mobile wireless communications device.

2. The electronic system of claim 1 wherein the digital promotion is for the desired item.

3. The electronic system of claim 1 wherein the digital promotion is for an item on the electronic shopping list other than the desired item.

4. The electronic system of claim 1 wherein the given received private two-way instant electronic message comprises a short message service (SMS) message.

5. The electronic system of claim 1 wherein the given received private two-way instant electronic message comprises a private two-way instant social media message.

6. The electronic system of claim 1 wherein the user identifier comprises at least one of an email address associated with the given user, a telephone number associated with the given user, and social media identifier associated with the user.

7. The electronic system of claim 1 wherein the remote computer is configured to store a purchase history associated with the given user and generate the digital promotion based upon the purchase history.

8. The electronic system of claim 1 further comprising a point-of-sale (POS) terminal configured to communicate products being purchased at the POS terminal to the remote computer during a purchase transaction and associated with the given user based upon the user identifier.

9. The electronic system of claim 8 wherein the remote computer and the POS terminal cooperate to redeem the digital promotion when the at least one item of the electronic shopping list is being purchased at the POS terminal.

10. A remote computer for an electronic system comprising a mobile wireless communications device associated with a given user and configured to send and receive a plurality of private two-way instant electronic messages between the given user and another user and store a plurality of user identifiers associated with the given user each for a corresponding retailer loyalty program for a given retailer from among a plurality of retailers and at least one access credential for accessing the corresponding retailer loyalty program, the remote computer comprising:

a processor and a memory cooperating to parse received private two-way instant electronic messages received by the mobile wireless communications device of the given user to determine existence of a plurality of keywords in a given received private two-way instant electronic message that are indicative of a desired item for purchase, the plurality of keywords comprising a retail store name associated with the given retailer, a descriptive term for the desired item for purchase, and a command action term for the desired item for purchase, and upon determining existence of the plurality of keywords in the given received private two-way instant electronic message, obtain the user identifier and the at least one access credential from the mobile wireless communications device corresponding to the given retailer associated with the parsed retail store name, access the retailer loyalty program based upon the user identifier and the at least one access credential, generate an electronic shopping list for the given retailer based upon the access to the retailer loyalty program and send the electronic shopping list to the mobile wireless communications device, the shopping list comprising the desired item for purchase, and generate a digital promotion associated with at least one item on the electronic shopping list and send notification of the digital promotion to the mobile wireless communications device.

11. The remote computer of claim 10 wherein the digital promotion is for one of the desired item and an item on the electronic shopping list other than the desired item.

12. The remote computer of claim 10 wherein the given received private two-way instant electronic message comprises one of a private short message service (SMS) message, and a private two-way instant social media message.

13. A method of sending notification of a digital promotion to a mobile wireless communications device associated with a given user and configured to store a plurality of user identifiers associated with the given user each for a corresponding retailer loyalty program for a given retailer from among a plurality of retailers and at least one access credential for accessing the corresponding retailer loyalty program, the method comprising:

using a remote computer to parse received private two-way instant electronic messages between the given user and another user received by the mobile wireless communications device of the given user to determine existence of a plurality of keywords in a given received private two-way instant electronic message that are indicative of a desired item for purchase, the plurality of keywords comprising a retail store name associated with the given retailer, a descriptive term for the desired item for purchase, and a command action term for the desired item for purchase, and upon determining existence of the plurality of keywords in the given received private two-way instant electronic message, obtain the user identifier and at the least one access credential from the mobile wireless communications device corresponding to the given retailer associated with the parsed retail store name, access the retailer loyalty program based upon the user identifier and the at least one access credential, generate an electronic shopping list for the given retailer based upon the access to the retailer loyalty program and send the electronic shopping list to the mobile wireless communications device, the shopping list comprising the desired item for purchase, and generate a digital promotion associated with at least one item on the electronic shopping list and send the notification of the digital promotion to the mobile wireless communications device.

14. The method of claim 13 wherein the digital promotion is for one of the desired item and an item on the electronic shopping list other than the desired item.

15. The method of claim 13 wherein the given received private two-way electronic message comprises one of a private short message service (SMS) message, and a private two-way instant social media message.

16. A non-transitory computer readable medium for a remote computer in an electronic system comprising a mobile wireless communications device associated with a given user and configured to store a plurality of user identifiers associated with the given user each for a corresponding retailer loyalty program for a given retailer from among a plurality of retailers and at least one access credential for accessing the corresponding retailer loyalty program, the non-transitory computer readable medium comprising computer executable instructions that when executed by a processor of the remote computer cause the processor to perform operations comprising:

parsing received private two-way instant electronic messages between the given user and another user received by the mobile wireless communications device of the given user to determine existence of a plurality of keywords in a given received private two-way instant electronic message that are indicative of a desired item for purchase, the plurality of keywords comprising a retail store name associated with the given retailer, a descriptive term for the desired item for purchase, and a command action term for the desired item for purchase; and upon determining existence of the plurality of keywords in the given received private two-way instant electronic message, obtaining the user identifier and the at least one access credential from the mobile wireless communications device corresponding to the given retailer associated with the parsed retail store name, accessing the retailer loyalty program based upon the user identifier and the at least one access credential, generating an electronic shopping list for the given retailer based upon the access to the retailer loyalty program and sending the electronic shopping list to the mobile wireless communications device, the shopping list comprising the desired item for purchase, and generating a digital promotion associated with at least one item on the electronic shopping list and sending notification of the digital promotion to the mobile wireless communications device.

17. The non-transitory computer readable medium of claim 16 wherein the digital promotion is for one of the desired item and an item on the electronic shopping list other than the desired item.

18. The non-transitory computer readable medium of claim 16 wherein the private two-way instant electronic message comprises one of a private short message service (SMS) message, and a private two-way instant social media message.

* * * * *

UNITED STATES PATENT AND TRADEMARK OFFICE
CERTIFICATE OF CORRECTION

PATENT NO. : 11,494,797 B1
APPLICATION NO. : 15/915429
DATED : November 8, 2022
INVENTOR(S) : Walker et al.

It is certified that error appears in the above-identified patent and that said Letters Patent is hereby corrected as shown below:

On the Title Page

Item (57), Line 1     Insert: --include-- after "may"

In the Specification

Column 7, Line 55     Delete: "fora"
                                    Insert: --for a--

Column 9, Line 9      Delete: "fora"
                                    Insert: --for a--

Signed and Sealed this
Twentieth Day of December, 2022

*Katherine Kelly Vidal*
Katherine Kelly Vidal
*Director of the United States Patent and Trademark Office*